United States Patent Office 3,347,853
Patented Oct. 17, 1967

3,347,853
1′H-PYRAZOLO [3′,4′:17,16]-Δ⁴,⁹,¹¹-ESTRATRIENE-3-ONE AND PROCESS FOR PREPARATION THEREOF
Robert Bucourt, Clichy-sous-Bois, and Andre Pierdet, Noisy-le-Sec, France, assignors to Roussel-UCLAF, Paris, France, a corporation of France
No Drawing. Filed Apr. 1, 1965, Ser. No. 444,825
Claims priority, application France, Apr. 10, 1964, 970,541
7 Claims. (Cl. 260—239.5)

The invention relates to the novel steroid, 1′H-pyrazolo [3′,4′:17,16]-Δ⁴,⁹,¹¹-estratriene-3-one which has the structural formula

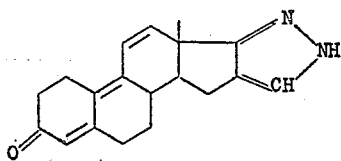

and to a novel process for its preparation and novel intermediates therefor.

Certain 17,16-pyrazolo-steroids are known. 17,16-pyrazolo-estradiols are stated to possess anticholesterolemiant activity (J. Med. Chem., 1963. p. 793 and Gazz., vol 93, 1963, p. 269) and 17,16-pyrazolo-Δ⁴-androstene-3-one is described to be effective in the assimilation of proteins Derwent Jap., vol. 2, No. 16, patent application No. 4,069/63). Unexpectedly, 1′H - pyrazolo [3′,4′:17,16]-Δ⁴,⁹,¹¹-estratriene-3-one possesses entirely different physiological effects, being devoid of estrogenic, androgenic and anabolisant activity and having a strong anti-zygote activity (reduces the rate of fertility in mammals).

It is an object of the invention to provide the novel steroid, 1′H-pyrazolo [3′,4′:17,16]-Δ⁴,⁹,¹¹-estratriene-3-one.

It is another object of the invention to provide a novel process for the preparation of 1′H-pyrazolo [3′,4′:17,16]-Δ⁴,⁹,¹¹-estratriene-3-one.

It is a further object of the invention to provide novel intermediates for 1′H-pyrazolo [3′,4′:17,16]-Δ⁴,⁹,¹¹-estratriene-3-one.

These and other objects and advantages of the invention will become obvious from the following detailed description.

The novel process for the preparation of the novel steroid, 1′H-pyrazolo [3′,4′:17,16]-Δ⁴,⁹,¹¹-estratriene-3-one comprises reacting 3-oximido-Δ⁴,⁹,¹¹-estratriene-17-one with a lower alkyl formate to form 3-oximido-16-formyl-Δ⁴,⁹,¹¹estratriene-17-one, reacting the latter with hydrazine to form 3-oximido-1′H-pyrazolo [3′,4′:17,16]-Δ⁴,⁹,¹¹-estratriene and hydrolyzing the latter under acidic conditions to form 1′H-pyrazolo [3′,4′:17,16]-Δ⁴,⁹,¹¹-estratriene-3-one. The reaction scheme is illustrated in Table I.

TABLE I

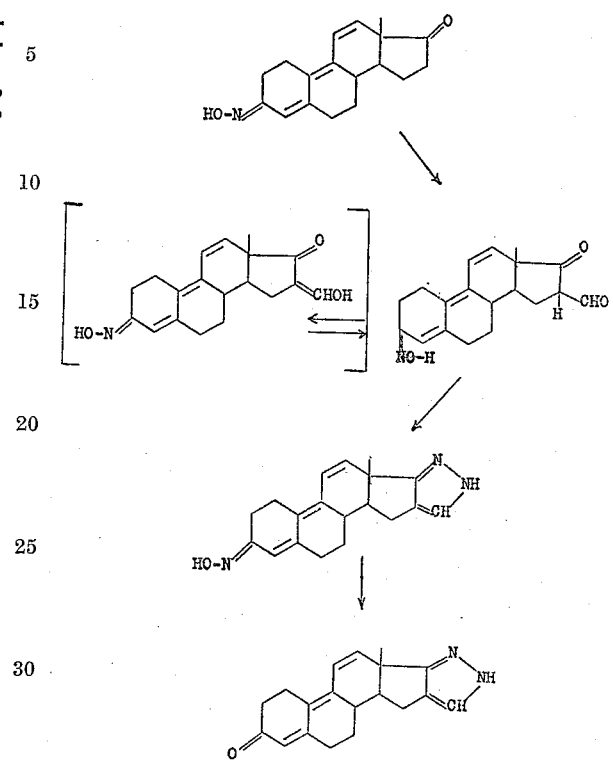

The formylation reaction with the lower alkyl formate may be effected in an organic solvent in the presence of a base such as an alkali metal alcoholate, sodium hydride, sodium or an organometallic derivative of magnesium, zinc, lithium, etc. Examples of suitable solvents are lower alkanols such as methanol, ethanol, etc., aromatic hydrocarbons such as benzene, toluene, etc., substituted amides such as dimethylformamide, etc., heterocyclic bases such as pyridine, etc., and ether such as ethyl ether, tetrahydrofuran, dioxane, etc. The solvents may be used alone or in mixture.

The hydrolysis of the 3-oximido group may be effected in an aqueous solution of a mineral or organic acid such as sulfuric acid, hydrochloric acid, sulfurous acid, persulfuric acid, nitrous acid (generated by reaction of acetic acid and sodium nitrite), oxalic acid, etc. or by reacting it in an acid medium with a carbonylated derivative such as formaldehyde, levulinic acid or pyruvic acid, etc. Pyruvic acid has the advantage of being used in aqueous acetic acid.

A preferred mode of the process comprises reacting 3-oximido-Δ⁴,⁹,¹¹-estratriene-17-one with ethyl formate in benzene free from methanol in the presence of sodium methylate to form 3-oximido-16-formyl-Δ⁴,⁹,¹¹-estratriene-17-one, reacting the latter with hydrazine hydrate in a lower alkanol such as methanol or ethanol to form 3-oximido-1′H-pyrazolo [3′,4′:17,16]-Δ⁴,⁹,¹¹-estratriene, reacting the latter was pyruvic acid in aqueous acetic acid to form 1′H-pyrazolo [3′,4′:17,16]-Δ⁴,⁹,¹¹-estratriene-3-one.

The starting material, 3-oximido-$\Delta^{4,9,11}$-estratriene-17-one, can be prepared according to the process of commonly assigned, copending application Ser. No. 397,627, filed Sept. 18, 1964 now abandoned which comprises reacting $\Delta^{4,9,11}$-estratriene-17β-ol-3-one with hydroxylamine to form 3-oximido-$\Delta^{4,9,11}$-estratriene-17β-ol and oxidizing the latter to form 3-oximido-$\Delta^{4,9,11}$-estratriene-17-one.

In the following example there is described a preferred embodiment to illustrate the invention. However, it should be understood that the invention is not intended to be limited to the specific embodiment.

EXAMPLE

*Preparation of the 1'H-pyrazolo[3',4':17,16]-$\Delta^{4,9,11}$-estratriene-3-one*

STEP A.—PREPARATION OF 3-OXIMIDO-16-FORMYL-$\Delta^{4,9,11}$-ESTRATRIENE-17-ONE (a) *Preparation of sodium methylate.*—1.25 gm. of sodium were introduced into 50 cc. of anhydrous benzene and 50 cc. of methanol and after disappearance of the sodium, the solution was distilled under agitation while steadily adding benzene until the temperature reached 80° C. The distillate was cooled in an ice bath and a suspension of sodium methylate in benzene free of methanol was obtained.

(b) *Formylation.*—To the suspension thus obtained, a solution of 2.83 gm. of 3-oximido-$\Delta^{4,9,11}$-estratriene-17-one in 20 cc. of anhydrous benzene and 30 cc. of ethyl formate was added and the reaction mixture was agitated at room temperature for three hours. Thereafter, 200 cc. of ice water were added and the solution was decanted. The aqueous phase was washed with benzene and then acidified to a pH of 3.5 by addition of concentrated hydrochloric acid. A precipitate was formed which was vacuum filtered, washed with water and dried under vacuum to obtain 2.54 gm. of 3-oximido-16-formyl-$\Delta^{4,9,11}$-estratriene-17-one having a melting point of $\approx$150° C.

This compound was insoluble in water, soluble in alcohol and chloroform and very soluble in the aqueous dilute alkalis.

This product is not described in the literature.

STEP B.—PREPARATION OF 3-OXIMIDO-1'H-PYRAZOLO [3',4' : 17,16]-$\Delta^{4,9,11}$-ESTRATRIENE At room temperature, 2.54 gm. of 3-oximido-16-formyl-$\Delta^{4,9,11}$-estratriene-17-one were dissolved in 50 cc. of ethanol and then 0.7 cc. of hydrazine hydrate was added drop by drop. The reaction mixture was agitated for 45 minutes at about 25° C., and then 100 cc. of ice water were slowly added. A precipitate was thus formed which was vacuum filtered, washed with water and dried under vacuum to obtain 1.8 gm. of 3-oximido-1'H-pyrazolo [3',4':17,16]-$\Delta^{4,9,11}$-estratriene having a melting point of $\approx$240° C.

This product was insoluble in water and soluble in alcohol and chloroform.

This compound is not described in the literature.

STEP C.—PREPARATION OF 1'H-PYRAZOLO [3',4' : 17,16]-$\Delta^{4,9,11}$-ESTRATRIENE-3-ONE A mixture of 1.8 gm. of 3-oximido-1'H-pyrazolo [3',4':17,16]-$\Delta^{4,9,11}$-estratriene, 60 cc. of acetic acid, 6 cc. of pyruvic acid and 60 cc. of water were heated at reflux for 1 hour with agitation and was then cooled. The reaction mixture was then slowly poured into 50 cc. of a saturated aqueous solution of sodium bicarbonate and extracted with methylene chloride. The extract was washed with water and evaporated to dryness under vacuum to obtain a residue which after crystallization from isopropyl ether produced 1.5 gm. of raw product. This product was subjected to chromatography through magnesium silicate and by elution with methylene chloride containing 5% of acetone, 1.020 gm. of product were isolated. Upon recrystallization from an isopropyl ether-methanol mixture, 0.58 gm. of 1'H-pyrazolo [3',4':17,16]-$\Delta^{4,9,11}$-estratriene-3-one having a melting point of 230–231° C. and a specific rotation $[\alpha]_D^{20} = +378°$ (c.=0.5% in methanol) were obtained.

This compound occurred in the form of prisms insoluble in water, slightly soluble in dilute aqueous acids and ether and soluble in alcohol, choloroform and benzene.

*Analysis.*—$C_{19}H_{20}ON_2$; molecular weight=292.37. Calculated: C,78.04%; H, 6.89%; N, 9.58%. Found: C, 77.9%; H, 7.0%; N, 9.4.

This product is not described in the literature.

Various modifications of the process of the invention may be made without departing from the spirit or scope thereof and it is to be understood that the invention is to be limited only as defined in the appended claims.

We claim:
1. 1'H-pyrazolo [3',4':17,16]-$\Delta^{4,9,11}$-estratriene-3-one.
2. 3-oximido-16-formyl-$\Delta^{4,9,11}$-estratriene-17-one.
3. 3 - oximido - 1'H-pyrazolo[3',4':17,16]-$\Delta^{4,9,11}$-estratriene.
4. A process for the preparation of 1'H-pyrazolo [3',4':17,16]-$\Delta^{4,9,11}$-estratriene-3-one which comprises reacting 3-oximido-$\Delta^{4,9,11}$-estratriene-17-one with a lower alkyl formate to form 3-oximido-16-formyl-$\Delta^{4,9,11}$-estratriene-17-one, reacting the latter with hydrazine to form 3-oximido-1'H-pyrazolo [3',4':17,16] - $\Delta^{4,9,11}$ - estratriene and hydrolyzing the latter under acidic conditions to form 1'H-pyrazolo [3',4':17,16]-$\Delta^{4,9,11}$-estratriene-3-one.
5. The process of claim 4 wherein the lower alkyl formate is ethyl formate and the reaction is effected in the presence of sodium methylate.
6. The process of claim 4 wherein the hydroylsis is effected with pyruvic acid in aqueous acetic acid.
7. A process for the preparation of 1'H-pyrazolo [3',4':17,16]-$\Delta^{4,9,11}$-estratriene-3-one which comprises reacting ethyl formate with 3-oximido-$\Delta^{4,9,11}$-estratriene-17-one in an organic solvent in the presence of sodium methylate to form 3-oximido-16-formyl-$\Delta^{4,9,11}$-estratriene-17-one, reacting the latter with hydrazine hydrate in ethanol to form 3-oximido-1'H-pyrazolo [3',4':17,16]-$\Delta^{4,9,11}$-estratriene and reacting the latter with pyruvic acid in aqueous acetic acid to form 1'H-pyrazolo [3',4':17,16]-$\Delta^{4,9,11}$-estratriene-3-one.

References Cited

UNITED STATES PATENTS 3,243,432  3/1966  De Ruggieri et al. __ 260—239.55

ELBERT L. ROBERTS, *Primary Examiner.*

H. FRENCH, *Assistant Examiner.*